June 21, 1927.
D. X. CLARIN
DISHWASHING MACHINE
Filed Dec. 24, 1926
1,633,396
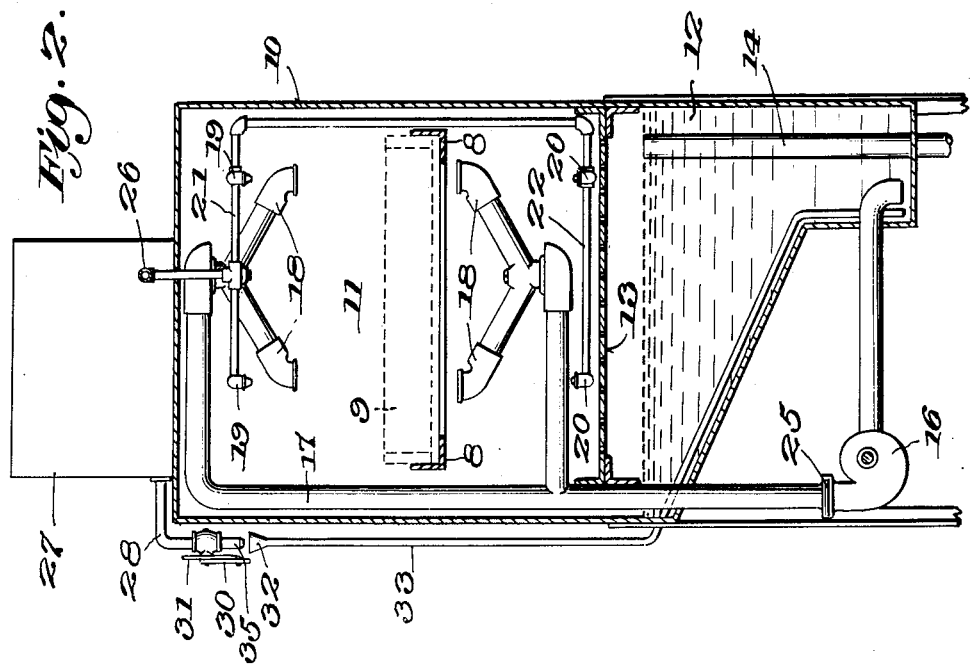
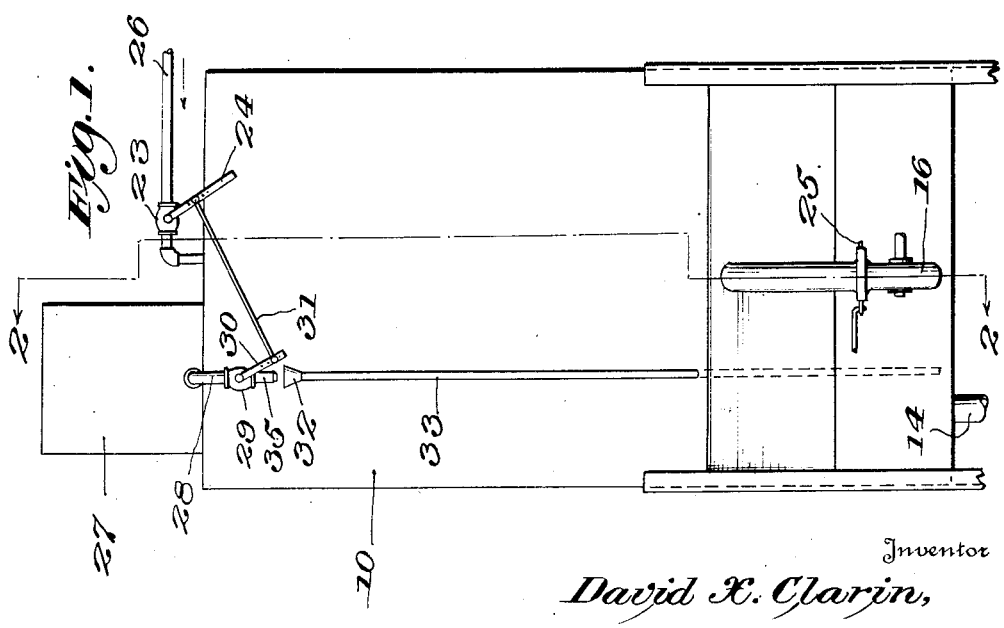
Inventor
David X. Clarin,
By Conway P. Cox
Attorney Patented June 21, 1927.

1,633,396

UNITED STATES PATENT OFFICE.

DAVID X. CLARIN, OF NEW YORK, N. Y., ASSIGNOR TO OAKITE PRODUCTS, INC., OF NEW YORK, N. Y., A CORPORATION OF NEW YORK.

DISHWASHING MACHINE.

Application filed December 24, 1926. Serial No. 156,826.

The present invention relates to dish washing machines, and particularly to those in which the washing and rinsing take place in the same chamber, the used rinse water being mixed with a cleansing agent and subsequently used as wash water.

In prior machines of this type, it has been customary to add the cleansing agent to the used rinse water manually, that is, the operator would add to the water which had been used for rinsing whatever amount of cleansing agent he wished, at intervals as frequent as he thought necessary. The disadvantage of this method is that the cleansing agent is either not put in when needed, or is put in in wasteful quantities, with the result that the efficiency of the machine is uncertain and the amount of cleansing agent used is unduly great.

The present invention aims to remove this difficulty by an apparatus which automatically proportions the cleansing agent to the rinse water used so that the optimum mixture may be present at all times in the machine.

Further objects of the invention will be apparent from the description when read in connection with the appended drawings, in which:

Fig. 1 represents a side elevation of a dish washing machine embodying my invention; and Fig. 2 is a section on the line 2—2 of Fig. 1.

The dish washing machine illustrated has a casing 10 which encloses the dish chamber 11, and a tank 12 positioned below the dish chamber. Horizontal supports 8 are provided for supporting a dish rack 9 in position in the dish chamber 11 to be operated upon by the machine. A screen 13 is located between the dish chamber 11 and the tank 12. The water level in the tank 12 is maintained at a suitable level by means of an overflow pipe 14.

The washing mechanism includes a centrifugal pump 16 adapted to draw water from the tank 12 and force it through a pipe 17 into wash water projectors 18 located above and below the dish chamber 11. The rinse mechanism includes spray nozzles 19, 20 located respectively above and below the dish rack, and pipes 21, 22 leading to the spray nozzles and governed by a manually operated valve 23 adapted to be operated by a hand lever 24.

The construction thus far described is old, and in common use in various machines. In the operation of such a machine, the water contained in the tank 12 is used over and over again in the washing of dishes, this water being forced up from the tank by the pump 16 and falling back into the tank after it has passed over the dishes. After the dishes have been cleaned by the action of the wash water, the supply of water to the projectors 18 is stopped by any suitable means such as a valve 25, or by stopping the pump 16. Clean rinse water is then projected against the dishes from the nozzles 19, 20 by opening the valve 23. The rinse water is supplied through pipe 26 from any suitable source of hot water. The used rinse water flows from the dish chamber 11 into the tank 12 and causes an overflow through the pipe 14, thereby carrying off the grease which floats on top of the water in the tank, leaving the water comparatively clean. After the washed dishes have been removed and replaced by soiled dishes, the valve 25 is opened to repeat the operation just described.

In the present invention, a liquid cleansing agent, preferably a dry detergent material dissolved in water, is placed in a tank 27 situated above the level of tank 12, and having an outlet pipe 28. A valve 29 of any suitable type controls the flow through pipe 28 and is itself controlled by the action of a lever 30 connected to lever 24 by a connecting rod 31 or other suitable connecting means. Whatever sort of connection between levers 30 and 24 is used, it is preferable to make it adjustable, so as to take care of varying water-pressure and other conditions of operation. In the illustrated embodiment, the adjustability is obtained by providing a series of holes in each of the levers, spaced longitudinally thereof, and adapted to be selectively engaged by the ends of rod 31. A nozzle 35 conducts the cleansing agent from valve 29 to a funnel 32, the nozzle and funnel being spaced vertically from each other to allow the operator to observe any stoppage or irregularity in the flow. A pipe 33 conducts the liquid to a point adjacent the bottom of tank 12. The nozzle 35 has a restricted bore, so that even upon slight opening of valve 29, the rate of flow through pipe 28 is limited by the capacity of the nozzle rather than by the valve. It is preferable to provide several interchangeable nozzles, with bores of different diameters, so that the operator may select and use the nozzle which is found to give the rate of flow best suited to the particular machine and conditions of operation.

In the operation of the device, the operator allows the wash water to flow until the dishes have been cleaned, then shuts it off and throws the lever 24 to fully open position. The rinse water is thereupon sprayed over the dishes in the usual manner, flowing down into tank 12. At the same time, the liquid cleansing agent also flows into tank 12 during the time of rinse, so that the concentration of cleansing agent in the tank is at all times approximately constant.

While I have described my invention as applied to a particular dishwashing machine, it will be understood that it is not limited in its application to the particular machine shown, but may be applied to various types of such machines.

Having described my invention, what I claim as new and desire to secure by Letters Patent of the United States is:

1. In a dish washing machine, a dish chamber, a conduit for conducting rinse water to said dish chamber, a tank adapted to receive rinse water flowing from said dish chamber, a valve in said conduit, a container for a cleansing agent, a second conduit extending between said container and said tank, a valve in said second conduit, and interconnected means for simultaneously operating said valves.

2. In a dishwashing machine having a dish chamber, a conduit for supplying rinse water to said chamber, control means for said conduit, a container for receiving the rinse water from said chamber, and means for returning the water in said container to said chamber; means for conducting a cleansing agent to said container, said means being controlled by said control means.

3. In a dishwashing machine, a dish chamber, a conduit for supplying water thereto, a receptacle adapted to receive water from said chamber, a container for a cleansing agent, a connection leading from said container to said receptacle, and interconnected valves for controlling the flow through said conduit and said connection.

4. In a dish washing machine, a dish chamber, a conduit for supplying water thereto, a receptacle for receiving water from said chamber, a container for a cleansing agent, a connection leading from said container to said receptacle, valves for controlling the flow through said conduit and said connection, and mechanism operative to simultaneously open and close said valves.

5. In a dish washing machine, a dish chamber, a conduit for supplying rinse water thereto, a receptacle positioned below said dish chamber for receiving used rinse water therefrom, a container for a cleansing agent, a connection leading from said container to said receptacle, valves in said conduit and said connection, controlling levers for said valves, and a connection between said levers whereby movement of one causes movement of the other.

DAVID X. CLARIN.